March 9, 1926.

C. E. MOSS 1,576,060

STORAGE BATTERY CARRIER AND GROUP PULLER

Filed Sept. 1, 1925

Inventor
Clarence E. Moss

By Watson E. Coleman
Attorney

Patented Mar. 9, 1926.

1,576,060

UNITED STATES PATENT OFFICE.

CLARENCE E. MOSS, OF PONCA CITY, OKLAHOMA.

STORAGE-BATTERY CARRIER AND GROUP PULLER.

Application filed September 1, 1925. Serial No. 53,940.

*To all whom it may concern:*

Be it known that I, CLARENCE E. Moss, a citizen of the United States, residing at Ponca City, in the county of Kay and State of Oklahoma, have invented certain new and useful Improvements in Storage-Battery Carriers and Group Pullers, of which the following is a specification, reference being had to the accompanying drawings.

This invention relates to storage battery carriers and group pullers.

An important object of the invention is the provision of a device of this character which may be employed for either lifting the whole or a single group of the battery and which is so constructed that it is readily applied to either the single group or the entire battery.

As is well known to those familiar with the art, wooden storage battery cases often rot with the result that the handles thereof pull off, necessitating carrying of the battery in the hands. This is hard on the clothes and furthermore, the storage battery is very awkward to handle in this manner. While tools have been provided for engaging the cell terminals in order to lift the storage battery, these tools are capable of use only for this purpose and if it is desired to lift a single cell of the battery, a separate tool is required. Accordingly, an important object of the invention is to provide a device which, because of its structure, is adaptable to either engage the terminals of cells at opposite ends of the battery to lift the battery or to engage the terminals of a single cell to lift this cell from the battery and which is likewise so constructed that short circuiting of either complete battery or the cell is prevented.

These and other objects I attain by the construction shown in the accompanying drawing, wherein for the purpose of illustration is shown a preferred embodiment of my invention and wherein:—

Figure 1:
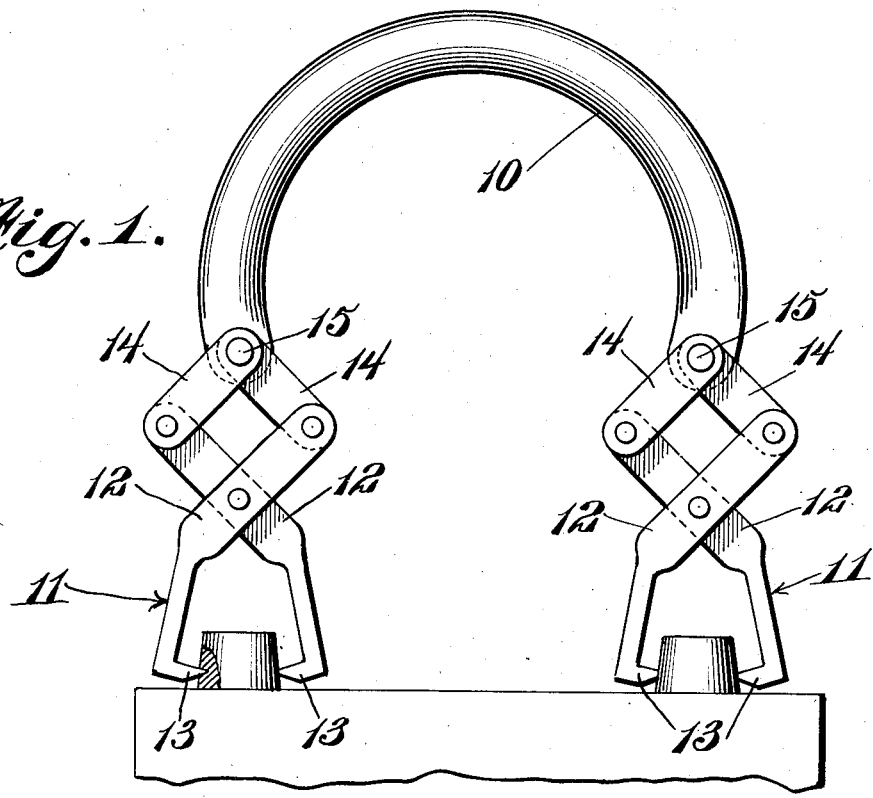
Figure 1 is a side elevation showing a storage battery carrier and group puller constructed in accordance with my invention in use to grip the terminals of a single group.
Figure 2:
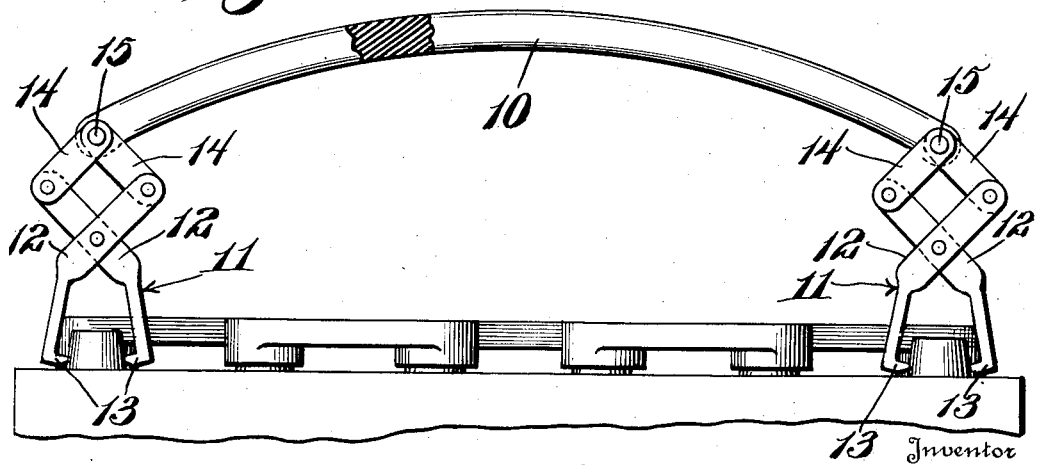
Figure 2 is a similar view showing the device in use to carry a storage battery, a portion of the handle being broken away.

Referring now more particularly to the drawing, the numeral 10 designates a length of flexible insulating material forming a handle. This handle is preferably constructed of rubber and has attached to opposite ends thereof gripping elements 11, which grip the terminals of the cell in proportion to the strain applied thereto.

In the present instance, these gripping elements are shown as consisting of a pair of pivotally connected cross levers 12, each having at its lower end a gripping jaw 13. The upper ends of the levers are connected by pivoted links 14 to a common pivot 15 upon the end of the handle.

It will readily be seen that the flexible handle 10 will permit the gripping elements 11 to move toward or away from one another so that they may be engaged with pole terminals, at opposite ends of a battery or with the pole terminals of a single cell. Thus, when the entire battery is to be lifted, the strain may be distributed between two cells of the battery and at the same time means are provided insulating these terminals from one another to prevent any shorting. A device of this character may be very readily and cheaply produced and very strongly constructed.

Since the gripping elements may obviously be altered in construction to a considerable extent without departing from the spirit of the invention, I do not limit myself to such specific structure except as hereinafter claimed.

I claim:—

1. In a battery carrier and group puller, a flexible insulating handle and coacting gripping elements carried by each end of the handle for engagement with the terminals of a battery or cell.

2. In a battery carrier and group puller, a flexible insulating handle and gripping elements carried by opposite ends of the handle for engagement with the terminals of a battery or cell and gripping the terminals in proportion to the strain placed upon the handle, said gripping elements comprising pivoted cross levers each having at their lower ends gripping jaws and at their upper ends connections with the ends of the handle urging the upper ends of the levers toward one another.

3. In a battery carrier and group puller, a flexible insulating handle, gripping elements carried by opposite ends of the handle for engagement with the terminals of a battery or cell and gripping the terminals in proportion to the strain placed upon the handle, said gripping elements each comprising pivoted cross levers each having at their lower ends gripping jaws and links connecting the upper ends of said levers to the associated end of the handle each of said links being pivotally connected to the handle and associated lever.

In testimony whereof I hereunto affix my signature.

CLARENCE E. MOSS.